US010261104B2

(12) United States Patent
Kim et al.

(10) Patent No.: US 10,261,104 B2
(45) Date of Patent: Apr. 16, 2019

(54) AROUND VIEW MONITORING SYSTEM AND METHOD FOR VEHICLES

(71) Applicant: HYUNDAI MOBIS Co., Ltd, Seoul (KR)

(72) Inventors: Jong Hwan Kim, Daegu (KR); Sang Kook Kim, Yongin-si (KR); Sung Wan Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 626 days.

(21) Appl. No.: 14/738,102

(22) Filed: Jun. 12, 2015

(65) Prior Publication Data
US 2016/0021312 A1  Jan. 21, 2016

(30) Foreign Application Priority Data
Jul. 15, 2014  (KR) .................. 10-2014-0089074

(51) Int. Cl.
| G06K 9/00 | (2006.01) |
| G01P 3/00 | (2006.01) |
| H04N 7/18 | (2006.01) |
| B60R 1/00 | (2006.01) |
| G06K 9/20 | (2006.01) |
| H04N 13/239 | (2018.01) |
| B60R 99/00 | (2009.01) |

(52) U.S. Cl.
CPC .................. *G01P 3/00* (2013.01); *B60R 1/00* (2013.01); *G06K 9/00791* (2013.01); *G06K 9/209* (2013.01); *H04N 7/181* (2013.01); *H04N 13/239* (2018.05); *B60R 2300/107* (2013.01); *B60R 2300/607* (2013.01)

(58) Field of Classification Search
CPC ...... H04N 13/0239; H04N 7/181; G01P 3/00; G06K 9/209; G06K 9/00791; B60R 1/00; B60R 2300/107; B60R 2300/607; B60R 2300/105; B60R 11/04; B60R 2300/802
See application file for complete search history.

(56) References Cited

U.S. PATENT DOCUMENTS

| 2008/0136612 A1* | 6/2008 | Machii ................ G01S 11/12 340/435 |
| 2010/0245577 A1 | 9/2010 | Yamamoto et al. |
| 2012/0262452 A1* | 10/2012 | Tadao ................ G02B 27/2264 345/419 |
| 2013/0285804 A1* | 10/2013 | Huang ................ G08G 1/16 340/441 |

(Continued)

FOREIGN PATENT DOCUMENTS

| CN | 202806557 U | 3/2013 |
| CN | 203063814 U | 7/2013 |

(Continued)

OTHER PUBLICATIONS

Chinese Office Action dated Mar. 8, 2017 in corresponding Chinese Application No. 201510382290.5 (5 pages in Chinese).

*Primary Examiner* — Mohammed Jebari
(74) *Attorney, Agent, or Firm* — NSIP Law

(57) ABSTRACT

Provided are an around view monitoring (AVM) system and method for vehicles. A front camera of an AVM system for vehicles is replaced with a stereo camera of an AS system, and thus, a system is simplified. Also, the AVM system and the AS system use a camera in common, thereby reducing the cost.

10 Claims, 9 Drawing Sheets

(56) References Cited

U.S. PATENT DOCUMENTS

| | | | | |
|---|---|---|---|---|
| 2014/0063197 A1* | 3/2014 | Yamamoto | ............. | G08G 1/166 |
| | | | | 348/46 |
| 2015/0145997 A1* | 5/2015 | Terashima | ......... | G06K 9/00791 |
| | | | | 348/148 |
| 2016/0042238 A1* | 2/2016 | Lynam | .................. | B60Q 9/005 |
| | | | | 701/45 |

FOREIGN PATENT DOCUMENTS

| CN | 103763470 A | 4/2014 |
|---|---|---|
| EP | 2233359 A1 | 9/2010 |
| KR | 10-2014-0080872 A | 7/2014 |

\* cited by examiner

US 10,261,104 B2

AROUND VIEW MONITORING SYSTEM AND METHOD FOR VEHICLES

CROSS-REFERENCE TO RELATED APPLICATIONS

This application claims priority under 35 U.S.C. § 119 to Korean Patent Application No. 10-2014-0089074, filed on Jul. 15, 2014, the disclosure of which is incorporated herein by reference in its entirety.

TECHNICAL FIELD

The present invention relates to an around view monitoring (AVM) system and method for vehicles, and more particularly, to an AVM system and method for monitoring situations around a vehicle by using cameras.

BACKGROUND

An AVM system for vehicles denotes a system that senses objects which are located within a range of 360 degrees with respect to a driver's vehicle.

FIG. 1 is a block diagram illustrating a configuration of a general AVM system for vehicles. FIG. 2 is a diagram three-dimensionally showing arrangement positions of four cameras of FIG. 1 disposed in a vehicle and four regions respectively photographed by the four cameras. FIG. 3 is a diagram showing an AVM image displayed by the general AVM system for vehicles.

Referring to FIGS. 1 and 2, the general AVM system for vehicles includes four camera units 11-1 to 11-4, an AVM unit 13, and a display unit 15.

The four camera units 11-1 to 11-4 respectively photograph four photographing regions R1 to R4 which include a front region, a rear region, a left region, and a right region of a vehicle.

The AVM unit 13 generates one image (hereinafter referred to as an AVM image) from four channel images of the photographing regions R1 to R4 respectively photographed by the camera units 11-1 to 11-4 and supplies the AVM image to a driver through the display unit 15.

The AVM image, which is supplied to the driver through the display unit 15, is as shown in FIG. 3. Referring to FIG. 3, a front image 31 of a front photographing region is disposed above an AVM image 39, a rear image 37 of a rear photographing region is disposed below the AVM image 39, a left image 33 of a left photographing region is disposed on the left of the AVM image 39, and a right image 35 of a right photographing region is disposed on the right of the AVM image 39.

Therefore, the driver may check objects, which are located within a range of 360 degrees with respect to its own driver, through one AVM image.

Recently, in the vehicle electronic field, an active safety system is being actively developed. The active safety system is used as a contrary concept of a passive safety system.

The passive safety system is the generic term for a system which operates a specific device after an accident occurs, and thus promotes safety of a driver. For example, as a type of the passive safety system, there is an air back system which operates an air back when a vehicle collision is sensed.

On the other hand, the active safety system is the generic term for a system which predicts occurrence of an accident and warns a driver of a result of the prediction. Examples of the active safety system may include a lane departure warning (LDW) system, a forward collision warning (FCW) system, a high beam assistant (HBA) system, etc.

A number of vehicle companies implement the active safety system by using an image processing operation based on a stereo camera.

As described above, the AVM system and the active safety system are systems that are attracting much attention for promoting the safe driving of all vehicles. When the systems are applied to one vehicle, a complexity of a vehicle electronic system increases.

Particularly, when the AVM system and the active safety system are all applied to one vehicle, camera sensors of the AVM system and camera sensors of the active safety system are equipped in the one vehicle, and for this reason, the cost increases, and resources are wasted by the camera sensors.

SUMMARY

Accordingly, the present invention provides an AVM system and method which enable different electronic systems to use a camera sensor in common, thereby minimizing the number of camera sensors and reducing the cost.

In one general aspect, an around view monitoring (AVM) system for vehicles, which cooperates with an active safety (AS) system for vehicles which controls active safety of a vehicle by using a stereo camera, includes: an operation start determination unit configured to determine an operation start condition of the AVM system, based on a velocity change mode and a vehicle velocity mode of the vehicle; a pathway switch unit configured to, when the velocity change mode and the vehicle velocity mode satisfy the operation start condition of the AVM system as a result of the determination, switch a transfer pathway of one of left and right images, captured by the stereo camera, from the AS system to the AVM system according to control by the operation start determination unit; and an AVM image processor configured to combine peripheral images of the vehicle, which are respectively captured by a plurality of cameras included in the AVM system, with the one image transferred from AS system through the pathway switch unit to generate a peripheral image indicating a situation around the vehicle.

In another general aspect, a method of monitoring an around view monitoring (AVM) system for vehicles, which cooperates with an active safety (AS) system for vehicles which includes a stereo camera, includes: determining an operation start condition of the AVM system, based on a velocity change mode and a vehicle velocity mode of the vehicle; when the velocity change mode and the vehicle velocity mode satisfy the operation start condition of the AVM system, switching a transfer pathway of one of left and right images, captured by the stereo camera, from the AS system to the AVM system; and combining peripheral images of the vehicle, which are respectively captured by a plurality of cameras included in the AVM system, with the one image transferred from AS system to generate a peripheral image for monitoring a situation around the vehicle.

In another general aspect, an around view monitoring (AVM) system for vehicles, which cooperates with an active safety (AS) system for vehicles which controls active safety of a vehicle by using a stereo camera including two cameras which are disposed in parallel, includes: an operation start determination unit configured to determine an operation start condition of the AVM system, based on a velocity change mode and a vehicle velocity mode of the vehicle; a pathway switch unit configured to, when the velocity change mode and the vehicle velocity mode satisfy the operation start condition, switch a transfer pathway of a wide-angle image, captured by a camera including a liquid lens among the two cameras, from the AS system to the AVM system according to control by the operation start determination unit; and an AVM image processor configured to combine peripheral images of the vehicle, which are respectively captured by a plurality of cameras included in the AVM system, with the wide-angle image transferred through the pathway switch unit to generate a peripheral image for monitoring a situation around the vehicle.

Other features and aspects will be apparent from the following detailed description, the drawings, and the claims.

DETAILED DESCRIPTION OF EMBODIMENTS

The present invention provides a method which replaces a front camera of an AVM system for vehicles with a stereo camera of an active safety (AS) system and thus simplifies the AVM system for vehicles and enables the AVM system and the AS system to use a camera in common, thereby reducing the cost.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terms used herein are for the purpose of describing particular embodiments only and are not intended to be limiting of example embodiments. As used herein, the singular forms "a," "an" and "the" are intended to include the plural forms as well, unless the context clearly indicates otherwise.

Hereinafter, embodiments of the present invention will be described in detail with reference to the accompanying drawings. In the following embodiments, an AVM system for monitoring situations within a range of 360 degrees with respect to a vehicle is assumed, but the present invention is not limited thereto. That is, the present invention may be applied to all kinds of systems that implement, based on a driving condition, various view modes such as a panorama view that monitors a front region and both side regions or monitors one side region under a high-speed straight condition, a front and rear view that monitors a front region and a rear region under a low-speed straight condition, and an around view that monitors a front region, a rear region, and both side regions under a high-speed turn condition, a low-speed turn condition, or a lane change condition.

Figure 4:
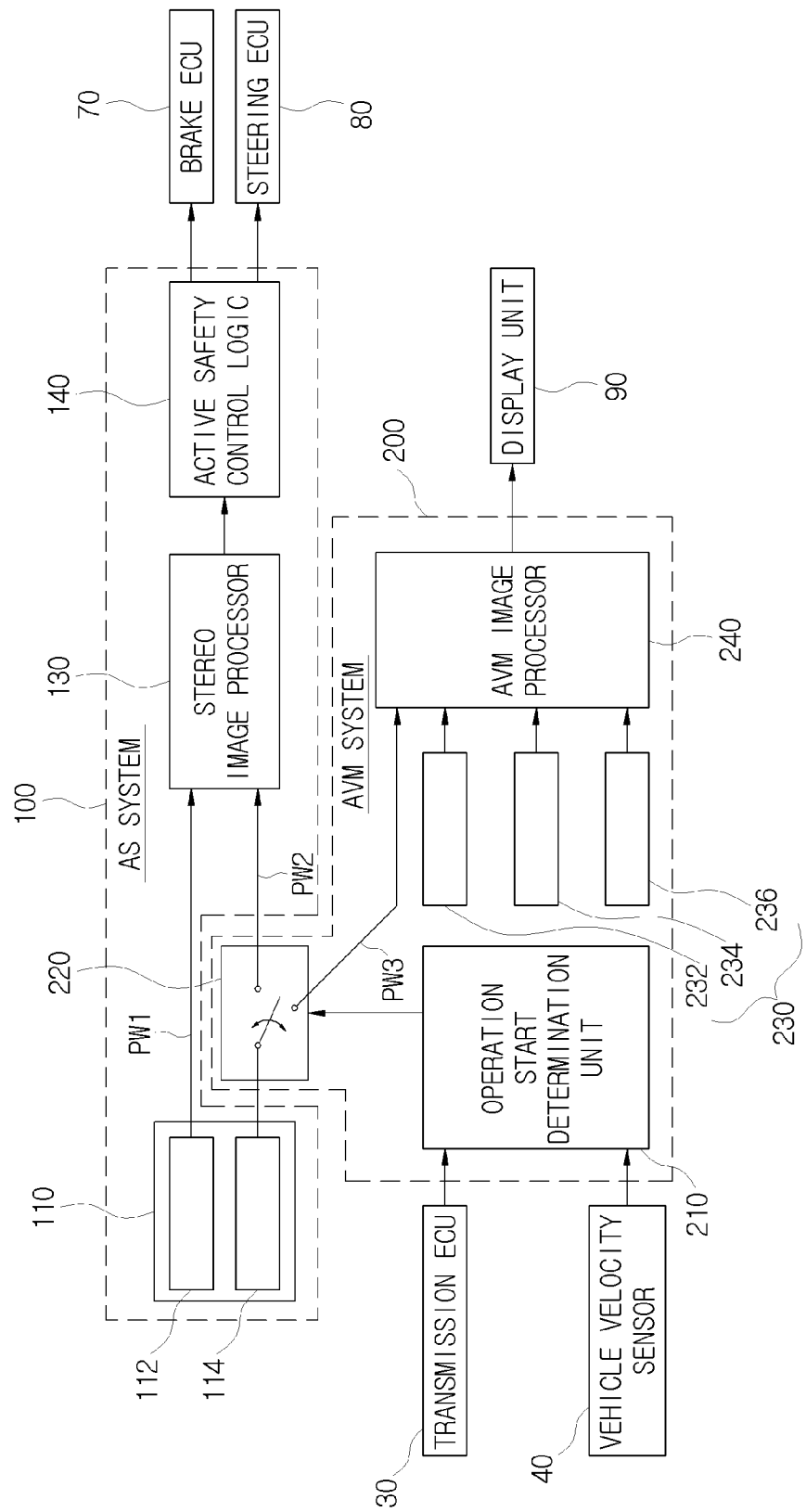
FIG. 4 is a block diagram illustrating an overall configuration of a vehicle electronic control system according to an embodiment of the present invention.

FIG. 4 is a block diagram illustrating an overall configuration of a vehicle electronic control system according to an embodiment of the present invention.

Referring to FIG. 4, the vehicle electronic control system according to an embodiment of the present invention may include an AS system 100 and an AVM system 200 that uses a stereo camera 110 which is equipped in the AS system 100.

The AS system 100 may include a stereo camera 110, a stereo image processor 130, and an active safety control logic 140.

Figure 5:
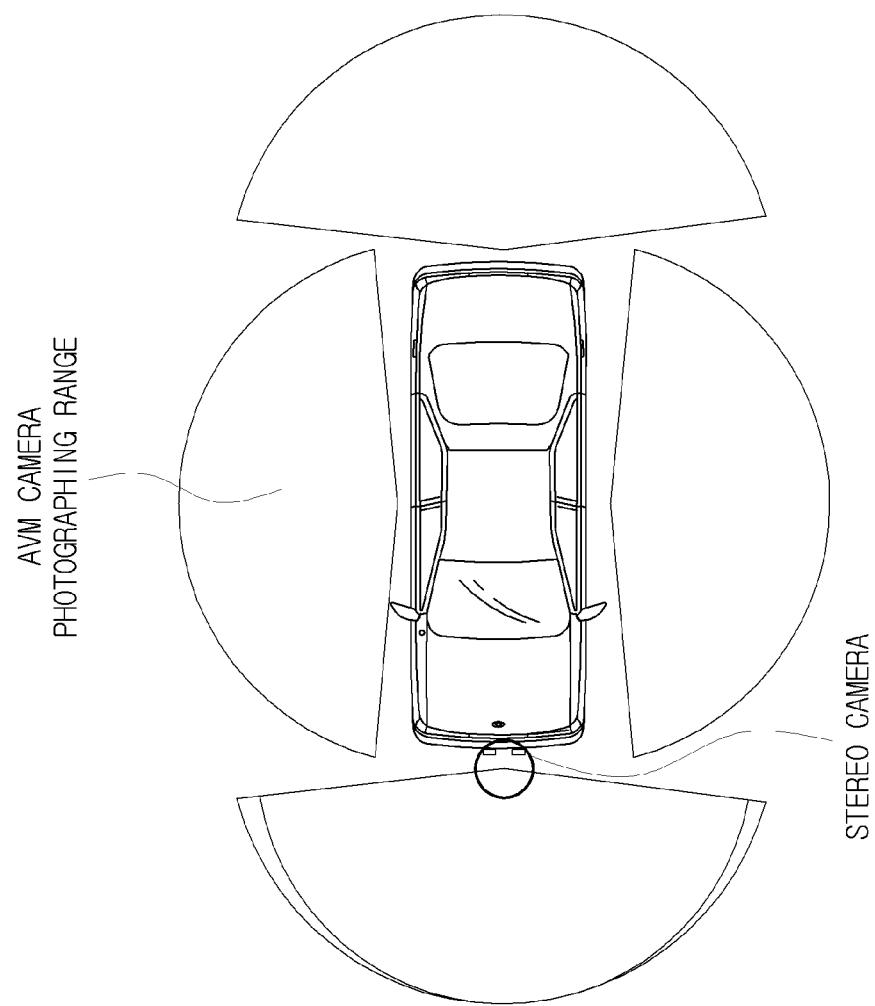
FIG. 5 is a diagram illustrating the kinds and an arrangement structure of cameras applied to the vehicle electronic control system according to an embodiment of the present invention.

The stereo camera 110, as illustrated in FIG. 5, may include a left camera 112 and a right camera 114 which are disposed at a front portion of a vehicle and photograph a front region of the vehicle. The left camera 112 may acquire a left view front image that is obtained by photographing the front region of the vehicle, and the right camera 114 may acquire a right view front image.

As described below in detail, the left view front image or the right view front image may be used as a front image of four channel images obtained by the AVM system 200. In the present embodiment, the right view front image is assumed as being used as a front image obtained by the AVM system 200.

The stereo image processor 130 may receive the left view front image from the stereo camera 110 through a first transfer pathway PW1 and receive the right view front image from the stereo camera 110 through a second transfer pathway PW2 which is generated by a path switch unit 220 of the AVM system 200.

The stereo image processor 130 may stereo-match the left view front image with the right view front image and may generate a depth image including distance information (distance information from the stereo camera 110 to an object) from the matched stereo image.

The active safety control logic 140 may perform a logic operation associated with active safety such as LDW control, FCW control, HBA control, and/or the like by using the depth image transferred from the stereo image processor 130.

A result of the logic operation may be transferred to a brake electronic control unit (ECU) 70, a steering ECU 80, and/or the like which are included in the vehicle. The brake ECU 70 and the steering ECU 80 may control the braking and steering of the vehicle, for the active safety of the vehicle.

The AVM system 200 which cooperates with the AS system 100 controlling the active safety of the vehicle may include an operation start determination unit 210, a pathway switch unit 220, an AVM camera 230, and an AVM image processor 240.

The operation start determination unit 210 may determine whether to start the AVM system 200 or the AS system 100, based on a vehicle velocity change mode and a vehicle velocity mode of the vehicle. The driving velocity change mode of the vehicle may include a parking mode, a reverse mode, and a driving mode. The parking mode and the reverse mode may be determined based on a position value of a transmission lever transferred from a transmission electronic control unit (ECU) 30. The vehicle velocity mode may include a low velocity mode and the driving mode. The low velocity mode may be defined as a case where a vehicle velocity value transferred from a vehicle velocity sensor 40 is less than a predetermined velocity value (for example, 20 km/h). The driving mode may be defined as a case where the vehicle velocity value is greater than the predetermined velocity value.

An operation start determining condition of the AVM system 200 or the AS system 100 determined by the operation start determination unit 210 may be shown in the following Table.

TABLE

|  | Velocity Changing Condition | Vehicle Velocity Condition |
|---|---|---|
| AVM mode operation | Parking mode (P) or reverse mode (R) | Low velocity mode (less than 20 km/h) |
| AS mode operation | Driving mode (D) | Driving mode (20 km/h or more) |

When the start of an operation of the AVM system 200 is determined, the pathway switch unit 220 may transfer, to the AVM image processor 240, the right front image acquired by the right camera 114 of the stereo camera 110 included in the AS system 100.

For example, the pathway switch unit 220 may receive a switching signal, which indicates an AVM operation mode, from the operation start determination unit 210 to switch the second transfer pathway PW2 to a third transfer pathway PW3 that connects the right camera 114 to the AVM image processor 240. When the pathway switch unit 220 receives a switching signal indicating an AS operation mode in a state of being switched to the third transfer pathway PW3, the pathway switch unit 220 may again switch the third transfer pathway PW3 to the second transfer pathway PW2.

The AVM camera 230 may include a left camera that photographs a left region of the vehicle, a right camera that photographs a right region of the vehicle, and a rear camera that photographs a rear region of the vehicle. Unlike a related art AVM system, the AVM camera 230 according to an embodiment of the present invention may not include a front camera that photographs a front region of the vehicle.

Figure 1:
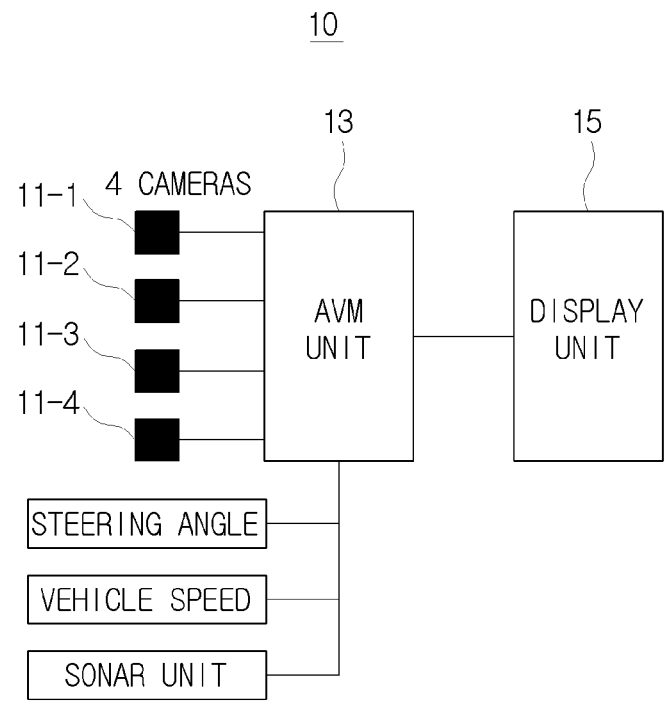
FIG. 1 is a block diagram illustrating a configuration of a general AVM system for vehicles.
Figure 2:
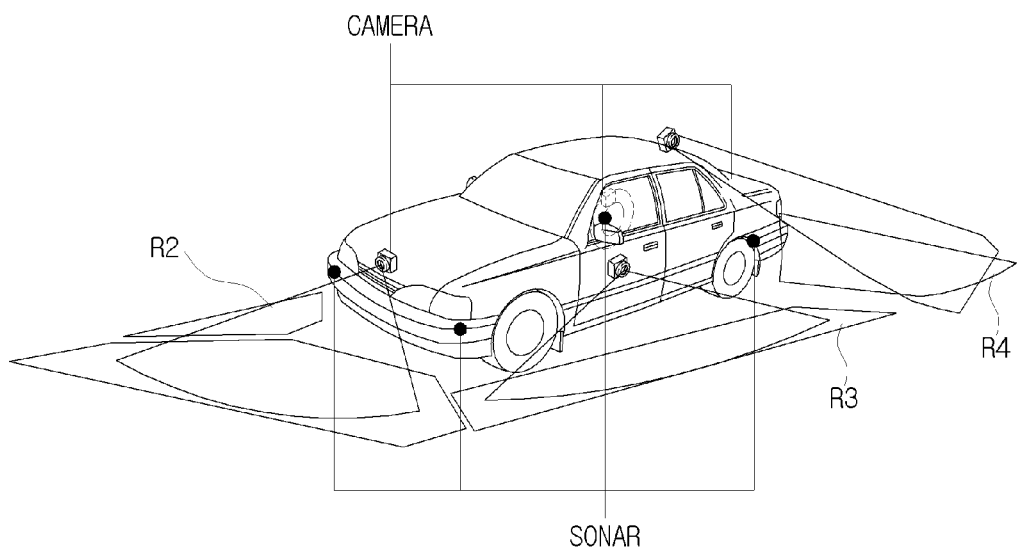
FIG. 2 is a diagram three-dimensionally showing arrangement positions of four cameras of FIG. 1 disposed in a vehicle and four regions respectively photographed by the four cameras.
Figure 3:
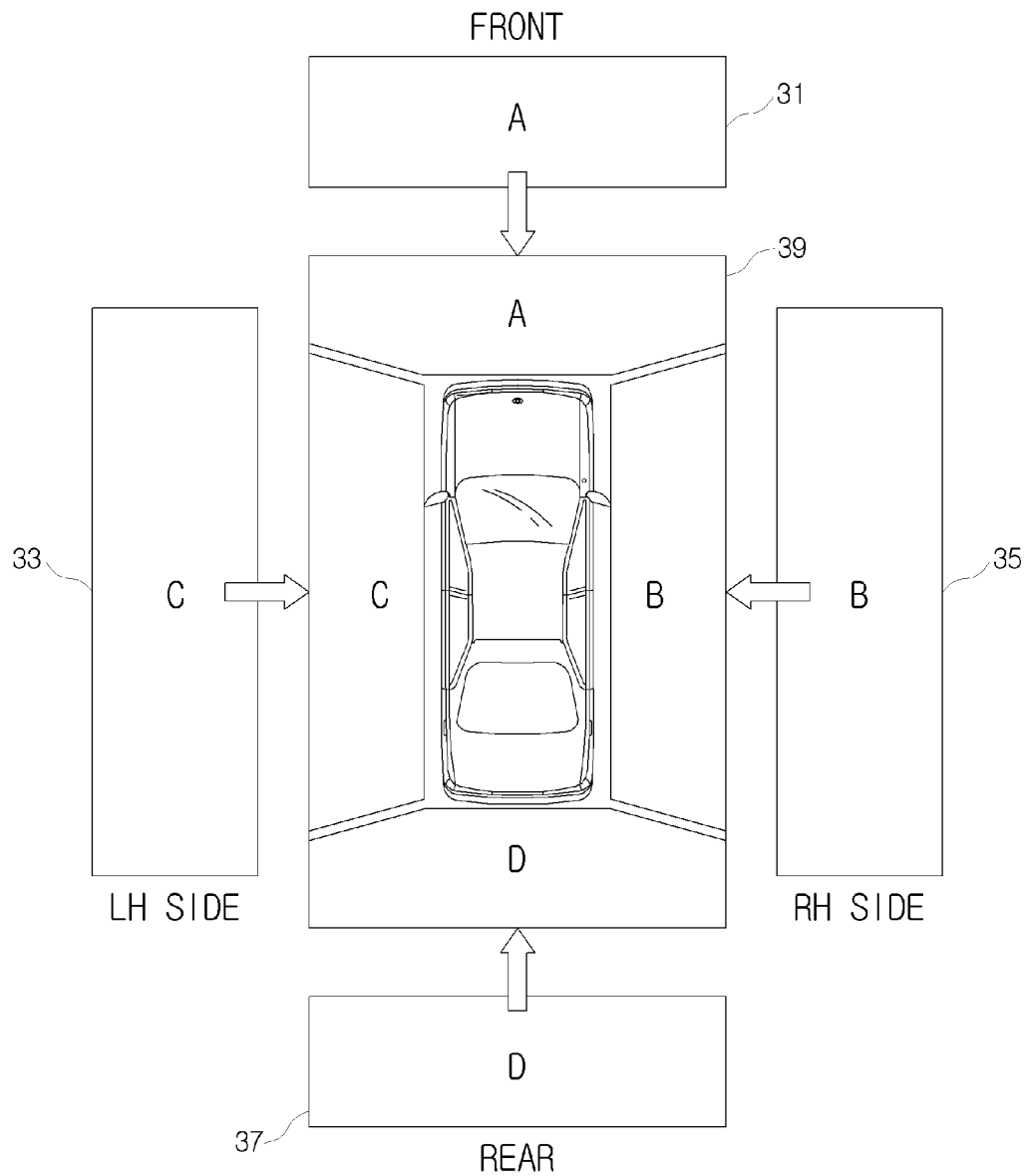
FIG. 3 is a diagram showing four channel images displayed by the general AVM system for vehicles.

The AVM image processor 240 may be a unit that performs image processing for generating four channel images (hereinafter referred to as a four-channel image) indicating situations within a range of 360 degrees with respect to the vehicle. The AVM image processor 240 may combine a left image, a right image, and a rear image, which are transferred from the AVM camera 230, with the right view front image transferred through the pathway switch unit 220 to generate a four-channel image 39 illustrated in FIG. 3.

The four-channel image 39 generated by the AVM image processor 240 may be transferred to the display unit 90, which may display the four-channel image 39.

In parking or backing the vehicle, the driver may monitor situations, which are within a range of 360 degrees with respect to the driver's vehicle, through the four-channel image 39 displayed by the display unit 90.

As described above, a front camera of a related art AVM system is replaced with a stereo camera of the AS system, and thus, a system is simplified. Also, the AVM system and the AS system use a camera in common, thereby reducing the cost.

Figure 6:
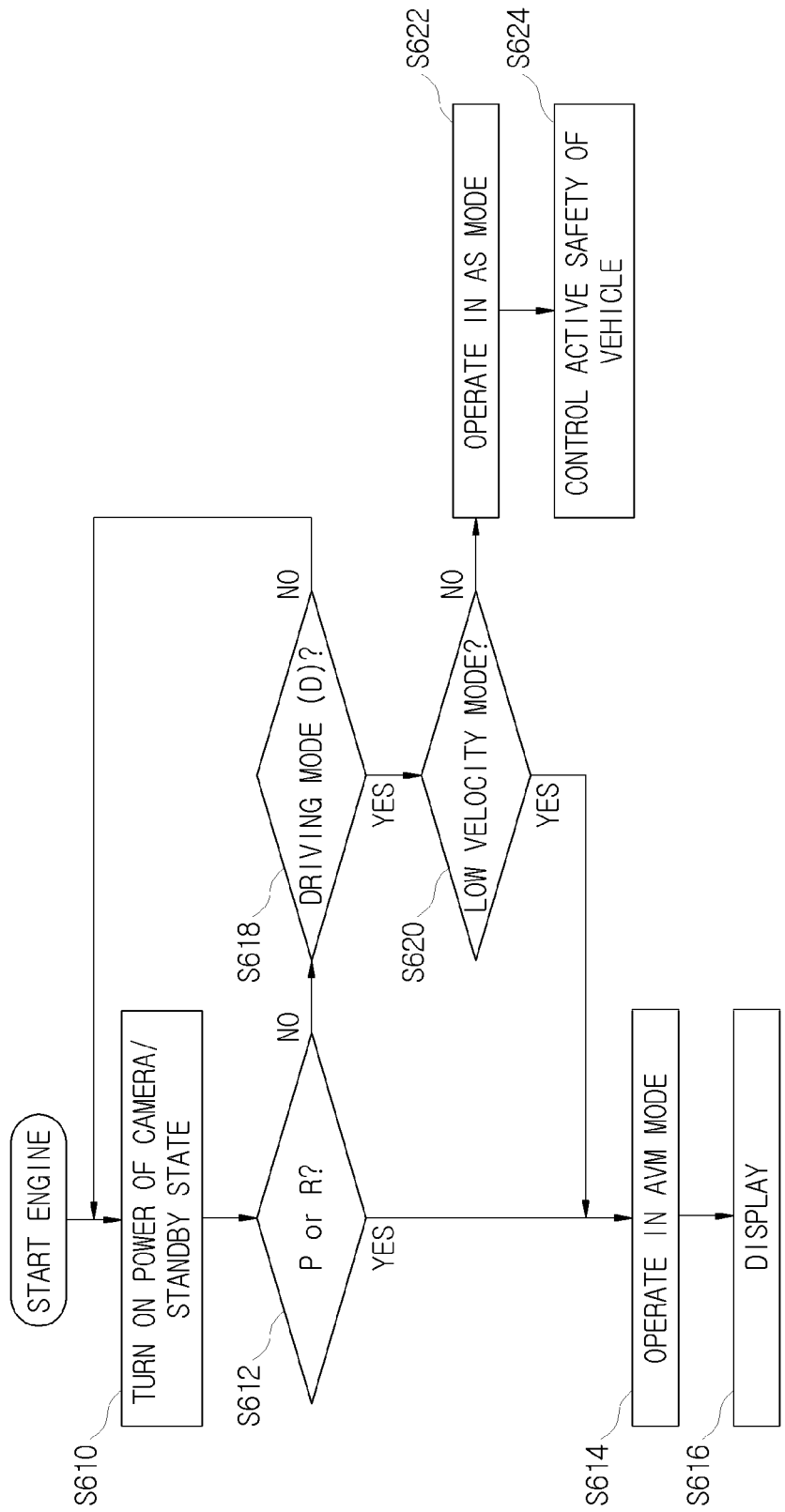
FIG. 6 is a flowchart illustrating a method of monitoring situations around a vehicle by using an AVM system according to an embodiment of the present invention.

FIG. 6 is a flowchart illustrating a method of monitoring situations around a vehicle by using an AVM system according to an embodiment of the present invention.

Referring to FIG. 6, in step S610, when a vehicle starts as engine (ON), power of a stereo camera which is disposed at a front portion of the vehicle may be turned on, and the stereo camera may be in a standby state.

In step S612, in the standby state of the stereo camera, when a parking mode (P) or a reverse mode (R) is input from a transmission ECU, a front image acquired by one camera of the stereo camera may be input to an AVM image processor.

In step S614, the AVM image processor may perform image processing for combining the front image, acquired by the one camera of the stereo camera, with left, right, and rear images acquired by the AVM camera to generate a four-channel image.

In step S616, the generated four-channel image may be displayed by various multimedia devices equipped in the vehicle.

However, when the parking mode (P) or the reverse mode (R) is not input from the transmission ECU in step S612, the method may proceed to step S618.

In step S618, the method may determine whether the driving mode (D) is input from the transmission ECU, and when the driving mode (D) is input, the method may proceed to step S620.

The method may determine whether a current mode is a low velocity mode indicating that a vehicle velocity input from a vehicle velocity sensor is less than a predetermined vehicle velocity (for example, 20 km/h) in step S620, and when the current mode is the low velocity mode, steps S614 and S616 may be performed.

When it is determined in step S620 that the current mode is a driving mode where the vehicle velocity input from the vehicle velocity sensor is equal to or higher than the predetermined vehicle velocity (for example, 20 km/h), an AS system may operate in step S622, and the active control of the vehicle may be performed by the AS system in step S624.

Hereinabove, in the embodiment of FIGS. 4 to 6, a method has been described where a front camera among four channel cameras of the AVM system is replaced with the stereo camera of the AS system.

The AVM system may include a wide-angle lens having a wide-angle characteristic, for photographing a 360-degree peripheral region by using AVM cameras driven by the AVM system. On the other hand, since the stereo camera used by the AS system is not for the purpose of photographing a 360-degree peripheral region of a driver's vehicle, the AVM system may include a narrow-angle lens having a narrow-angle characteristic. An image captured by the narrow-angle lens is narrower in photographing range than a peripheral image captured by the wide-angle lens, and thus, it is difficult to realize a complete four-channel image desired by the AVM system.

Figure 7:
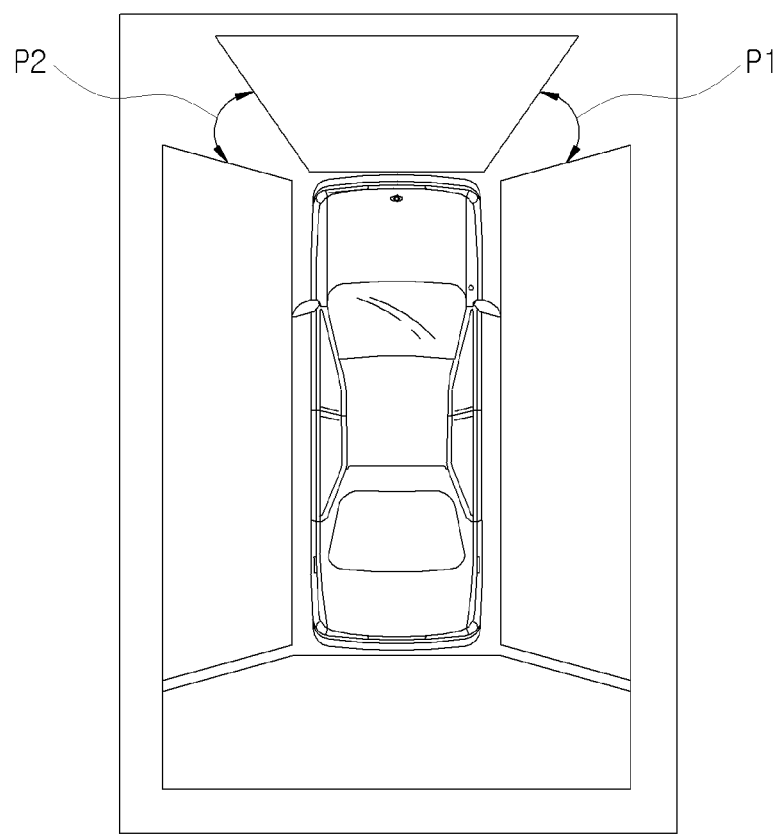
FIG. 7 is a diagram illustrating a four-channel image according to an embodiment of the present invention.

That is, when the AVM system generates a four-channel image from a front image acquired by one camera, having the narrow-angle characteristic, of the stereo camera, regions P1 and P2 may not be displayed as illustrated in FIG. 7, and thus, it is difficult to display the complete four-channel image for monitoring situations within a range of 360 degrees with respect to the driver's vehicle.

Therefore, in another embodiment of the present invention, the one camera of the stereo camera may include a liquid lens having both the narrow-angle characteristic and the wide-angle characteristic. Also, a pathway for transferring information may be provided between the one camera having the liquid lens and the AVM system, the liquid lens may be controlled to have the wide-angle characteristic while the AVM system is operating, and the liquid lens may be controlled to have the narrow-angle characteristic while the AS system is operating.

To help the understanding of the liquid lens, a liquid lens applicable to the present invention will be described in brief with reference to FIGS. 8 to 10.

Liquid Lens

Figure 8:
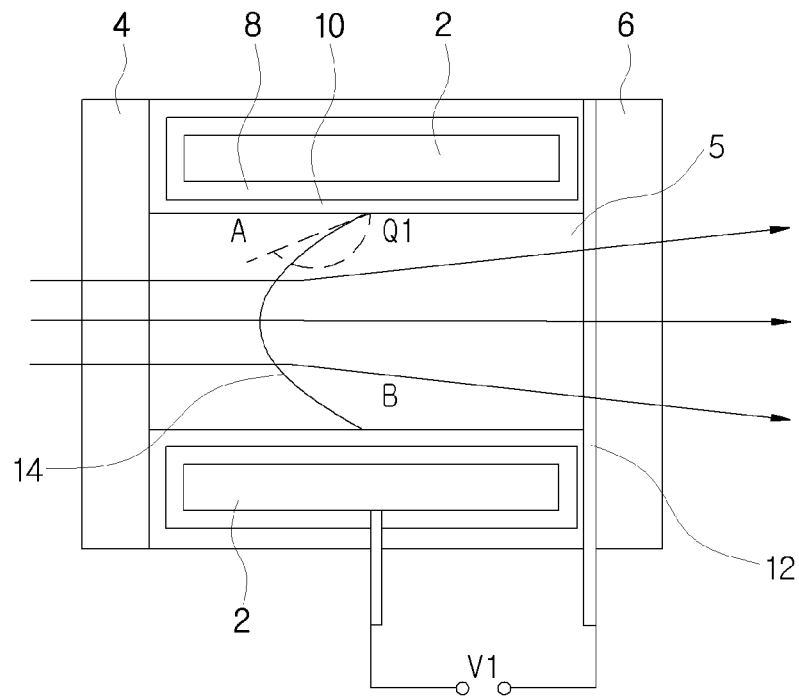
FIGS. 8 to 10 are diagrams for describing a liquid lens applied to a stereo camera according to an embodiment of the present invention.
Figure 9:
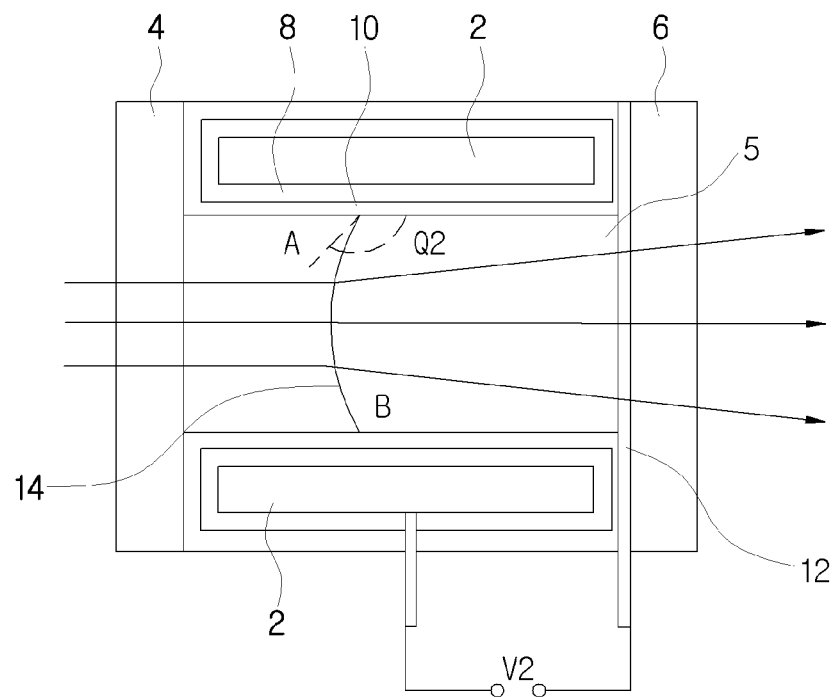
Figure 10:
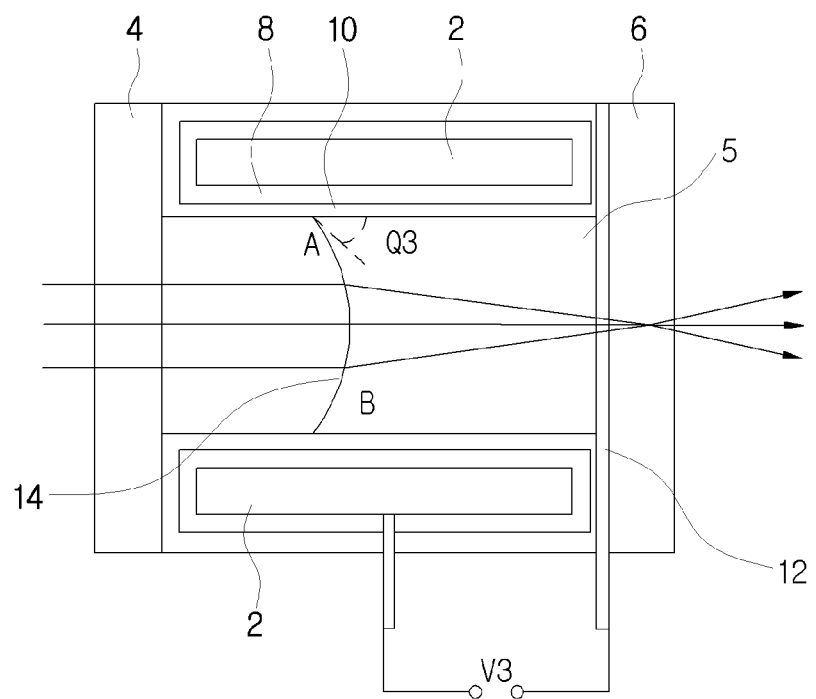

FIGS. 8 to 10 are diagrams for describing the principle of a liquid lens applied to a stereo camera according to an embodiment of the present invention.

Referring to FIGS. 8 to 10, the liquid lens may include a first fluid A and a second fluid B which have different refractive indexes, are immiscible, and contact each other through a meniscus 14.

Moreover, the liquid lens may include a cylinder-shaped liquid chamber 5 that includes a wall of a cylinder, a fluid contact layer 10 that is disposed on an inner wall of the cylinder, a first electrode 2 that is separated from the first and second fluids A and B by the fluid contact layer 10, and a second electrode 12 that activates the second fluid B.

The first electrode 2 may be formed of a metal material to have a cylindrical shape and may be coated by an insulating layer 8, and the second electrode 12 may be disposed on one side of the liquid chamber 5. Also, a transparent front element 4 and a transparent rear element 6 may configure a cover of the liquid chamber 5 that accommodates the first and second fluids A and B.

An operation of the liquid lens will now be described.

When a voltage is not applied between the first electrode 2 and the second electrode 12, the fluid contact layer 10 may have higher wettability to the first fluid A than the second fluid B.

For example, when voltages V1 to V3 are applied between the first electrode 2 and the second electrode 12, due to electro-wetting, wettability based on the second fluid B may be changed, and contact angles Q1 to Q3 of the meniscus 14 illustrated in FIGS. 8 to 10 may be changed. Therefore, a shape of the meniscus 14 may be changed according to an applied voltage, and a focus of the liquid lens may be adjusted by using the changed shape.

That is, as illustrated in FIGS. 8 to 10, an angle (measured from the first fluid B) between the meniscus 14 and the fluid contact layer 10 may be changed from an obtuse angle to an acute angle according to a level of the applied voltage, and for example, may be changed to about 140 degrees, 100 degrees, 60 degree, or the like.

Therefore, since the focus of the liquid lens is adjusted according to the applied voltage, the liquid lens may have both the wide-angle characteristic and the narrow-angle characteristic.

Hereinafter, a vehicle electronic control system that generates an AVM image by using the stereo camera including the above-described liquid lens will be described.

Figure 11:
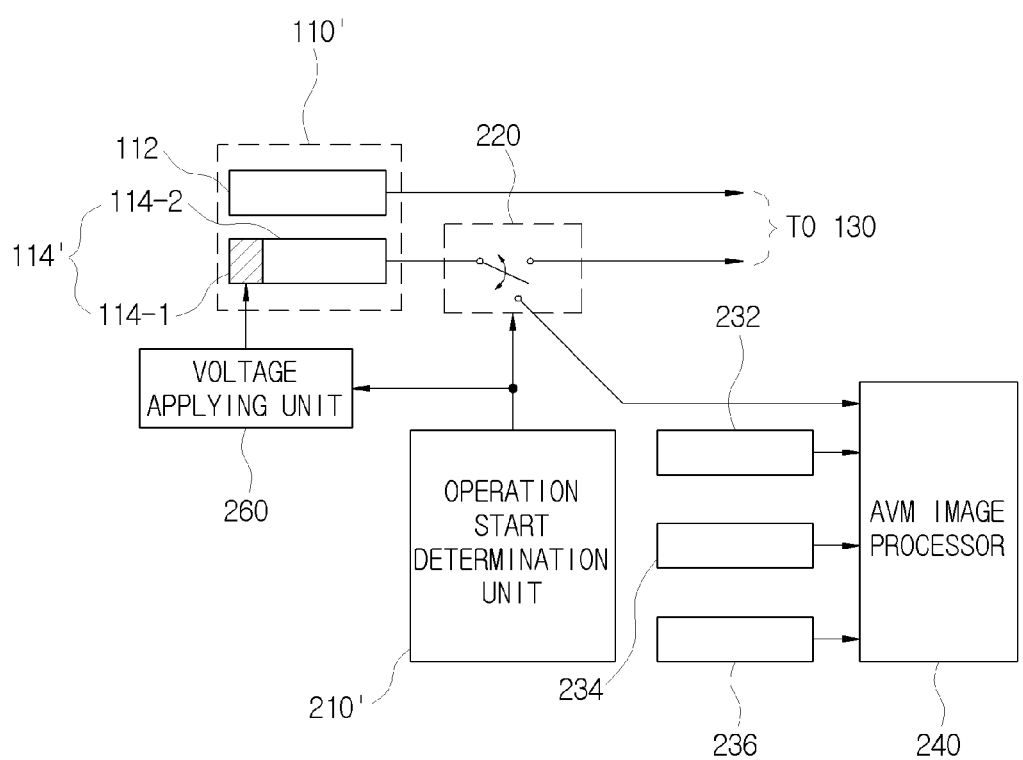
FIG. 11 illustrates a vehicle electronic control system according to another embodiment of the present invention.

FIG. 11 illustrates a vehicle electronic control system according to another embodiment of the present invention.

Referring to FIG. 11, in the vehicle electronic control system according to another embodiment of the present invention, one camera which configures a stereo camera 110' of an AS system may be replaced with a camera 114' including a liquid lens. Also, the vehicle electronic control system may further include a voltage applying unit 260 that applies a voltage to a liquid lens 114-1 so that the camera 114' operates based on a narrow-angle characteristic while the AS system is operating, and operates based on a wide-angle characteristic while the AVM system is operating.

The other elements 220, 232, 234, 236 and 240 illustrated in FIG. 11 respectively perform the same functions as those of the elements 220, 232, 234, 236 and 240 illustrated in FIG. 4, and thus, their detailed descriptions are not repeated.

An operation start determination unit 210' of FIG. 11 may have a difference with the operation start determination unit 210 of FIG. 4 in that the operation start determination unit 210' supplies a determination result to the voltage applying unit 260.

That is, the operation start determination unit 210' according to another embodiment of the present invention may determine a condition for starting an operation of the AS system 100 or the AVM system 200, based on a velocity change mode and a vehicle velocity mode of a vehicle and may transfer, to the voltage applying unit 260, an AS operation mode signal which indicates an operation mode of the AS system 100 and an AVM operation mod signal which indicates an operation mode of the AVM system, based on a result of the determination.

When the voltage applying unit 260 receives the AS operation mode signal, the voltage applying unit 260 may apply a first voltage to the liquid lens 114-1 so that the liquid lens 114-1 of the camera 114' configuring the stereo camera operates based on the narrow-angle characteristic.

On the other hand, when the voltage applying unit 260 receives the AVM operation mode signal, the voltage applying unit 260 may apply a second voltage to the liquid lens 114-1 so that the liquid lens 114-1 operates based on the wide-angle characteristic.

As described above, in another embodiment of the present invention, the front camera among the four-channel cameras in the AVM system may be replaced with the stereo camera including the liquid lens which operates based on the wide-angle characteristic in the AVM operation mode. Therefore, the AVM system and the AS system use the front camera in common, thereby reducing the cost.

According to the embodiments of the present invention, the AVM system and the AS system use a camera sensor in common, and thus, the number of cameras equipped in a vehicle is reduced, thereby lightening a vehicle and reducing the cost.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An around view monitoring (AVM) system for vehicles, which cooperates with an active safety (AS) system for vehicles which controls active safety of a vehicle by using a stereo camera, the AVM system comprising:
   an operation start determination processor configured to determine an operation start condition of the AVM system, based on a velocity change mode and a vehicle velocity mode of the vehicle;
   a switch configured to receive one of left and right images from the AS system, and in response to the velocity change mode and the vehicle velocity mode satisfying the determined operation start condition of the AVM system, send the one of the left and right images to one of a stereo image processor of the AS system and the AVM system depending on whether the vehicle exceeds a velocity threshold; and an AVM image processor configured to combine peripheral images of the vehicle, which are respectively captured by a plurality of cameras, with the one of the left and right images transferred from the AS system to the AVM system to generate a combined image showing a situation around the vehicle, wherein another one of the left and right images is fed to the stereo image processor without passing through the switch at all vehicle speeds.

2. The AVM system of claim 1, wherein the operation start determination processor is further configured to determine a start of an operation of the AVM system, in response to the velocity change mode being a parking mode or a reverse mode.

3. The AVM system of claim 1, wherein the operation start determination processor is further configured to determine a start of an operation of the AVM system, in response to the velocity change mode being a low velocity driving mode in which a velocity of the vehicle is lower than the velocity threshold.

4. The AVM system of claim 1, wherein
the one of the left and right images comprises a front image of the vehicle, and
the peripheral images of the vehicle comprise the another one of the left and right images, and a rear image of the vehicle.

5. The AVM system of claim 1, wherein
the operation start determination processor is further configured to determine a start of an operation of the AVM system, in response to the velocity change mode being a low velocity driving mode in which a velocity of the vehicle is lower than the velocity threshold, and
the switch is further configured to switch the transfer pathway of the one of the left and right images according to the start of the AVM system.

6. A method of monitoring an around view monitoring (AVM) system for vehicles, which cooperates with an active safety (AS) system for vehicles which includes a stereo camera, the method comprising:

determining an operation start condition of the AVM system, based on a velocity change mode and a vehicle velocity mode of the vehicle;

in response to the velocity change mode and the vehicle velocity mode satisfying the determined operation start condition of the AVM system, sending, through a switch, one of left and right images to one of a stereo image processor of the AS system and the AVM system depending on whether the vehicle exceeds a velocity threshold; and combining peripheral images of the vehicle, which are respectively captured by a plurality of cameras included in the AVM system, with the one of the right and left images transferred from the AS system to the AVM system to generate a combined image showing a situation around the vehicle, wherein another one of the left and right images is fed to the stereo image processor without passing through the switch at all vehicle speeds.

7. The method of claim 6, wherein the determining of the operation start condition comprises determining to start an operation of the AVM system, in response to the velocity change mode being a parking mode or a reverse mode.

8. The method of claim 6, wherein the determining of the operation start condition comprises determining a start of an operation of the AVM system, in response to the velocity change mode being a low velocity driving mode in which a velocity of the vehicle is lower than the velocity threshold.

9. The method of claim 6, wherein
the one of the left and right images comprises a front image of the vehicle, and
the peripheral images of the vehicle comprise the another one of the left and right images, and a rear image of the vehicle.

10. The method of claim 6, wherein the determining of the operation start condition comprises
determining a start of an operation of the AVM system, in response to the velocity change mode being a low velocity driving mode in which a velocity of the vehicle is lower than the velocity threshold, and
switching the transfer pathway of the one of the left and right images from the AS system to the AVM system according to the start of the AVM system.

* * * * *